(12) United States Patent
Kuczynski et al.

(10) Patent No.: US 7,317,514 B2
(45) Date of Patent: Jan. 8, 2008

(54) SYSTEM AND METHOD FOR OPTIMIZING HEAT MANAGEMENT

(75) Inventors: Joseph Kuczynski, Rochester, MN (US); Arvind Kumar Sinha, Rochester, MN (US); Kevin Albert Splittstoesser, Stewartville, MN (US); Timothy Jerome Tofil, Rochester, MN (US); Paul Alan Vermilyea, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 11/050,053

(22) Filed: Feb. 3, 2005

(65) Prior Publication Data

US 2006/0170904 A1 Aug. 3, 2006

(51) Int. Cl.
*G01B 11/16* (2006.01)

(52) U.S. Cl. .......................................... 356/32; 702/64

(58) Field of Classification Search .................. 356/32; 702/64, 99
See application file for complete search history.

(56) References Cited

U.S. PATENT DOCUMENTS

| 2001/0022804 A1* | 9/2001 | Helmig et al. .............. 374/161 |
| 2003/0195709 A1 | 10/2003 | Rudrud |
| 2004/0194096 A1 | 9/2004 | Christensen et al. |

FOREIGN PATENT DOCUMENTS

WO     WO 00/43729 A1     7/2000

* cited by examiner

*Primary Examiner*—Gregory J. Toatley, Jr.
*Assistant Examiner*—Tri Ton
(74) *Attorney, Agent, or Firm*—Mathew C. Zehrer

(57) ABSTRACT

Disclosed are heat management method, and system, and computer program product that include at least one optical strain gauge that is mounted on a printed board in proximity to an object being monitored for temperature changes. Power for controlling heat to the object is modified in response to changes in the optical reference signal of the gauge, whereby such changes are correlated to the rate of strain change in the object as measured relative to predefined temperature changes of the object being monitored.

17 Claims, 4 Drawing Sheets

SYSTEM AND METHOD FOR OPTIMIZING HEAT MANAGEMENT

BACKGROUND OF THE INVENTION

The present invention relates to a system and method particularly adapted for pre-damage heat management.

Temperature control of physical objects has always been an important consideration. Managing heat in electronic systems is important since the higher temperatures lead to lower reliability and performance. Managing heat in electronic systems today is particularly challenging given the trend of electronic enclosures having increasingly smaller form factors and the electronic components having increased power demands. The thermal envelope to be controlled in computer systems is challenging given the ever-increasing higher circuit densities and higher clock frequencies that are encountered. Moreover, in such environments, the heating issues are generally widespread and more difficult to manage since power distribution affects all circuits and electrical components. It follows that failure to adequately manage heating issues may lead to the destruction of costly systems.

One pervasive approach monitors heat before it causes significant damage. Numerous solutions of this kind exist in electronic systems. One type includes use of conventional temperature sensors that are triggered when components and/or system temperatures, indicative of heat-induced damage, have been reached. Some triggering events usually occur just before or during the occurrence of fire, while others are the occurrence of smoke. Still other approaches, such as described in copending and commonly assigned U.S. patent application Ser. No. 10/120,877, describe measuring fluctuations of electrical reference signal deviations of the circuit being monitored. Signal anomalies provide precursors for detecting potential fire and/or smoke damage. The anomalies when detected cause a controller to shut down power in order to halt heat damage. Another approach, disclosed in copending and commonly assigned U.S. patent application Ser. No. 10/268,738, describes heat sensitive coatings that outgas when predetermined temperatures, indicative of heat-induced damage, are reached. When gas is detected, a notification signal is sent to a shutdown controller for initiating immediate power shutdown for the system.

Despite the foregoing, ongoing efforts continue for providing advancements in reliable and highly responsive methods and systems that respond quickly to events indicative of potential heat-induced damage. Without such advancements, the true potential of pre-damage heat management may not be fully achieved, particularly in computer systems.

SUMMARY OF THE INVENTION

The present invention provides enhanced methods, systems, and computer program products for monitoring and controlling heat of an object being monitored without negative effect.

Aspects of the present invention include enhanced methods, and systems, and computer program products for monitoring a change in an optical reference signal of an optical reference signal monitor assembly, whereby changes of the signal are responsive to the differential strain due to temperature variations of an object being monitored; determining if the rate of strain change over a predefined temperature range reaches a threshold level; and, if the determining is true, then providing a representative signal of such event.

These and other aspects of the present invention will be more fully understood from the following detailed description of the preferred embodiments, which should be read in light of the accompanying drawings. It should be understood that both the foregoing description and the following detailed description are exemplary and not restrictive.

DETAILED DESCRIPTION

FIGS. 1-4 illustrate one preferred embodiment of the present invention that is particularly adapted for monitoring the effects of heat on objects, such as the circuit board itself or electrical components mounted on a circuit board, and taking appropriate controlling actions to modify the temperature of the object(s), such as by decreasing electrical power to the object to decrease heat. Appropriate controlling measures selected may be from a group of activities including: terminating power to the object; reducing power to the object; and, increasing power to the object.

Figure 1:
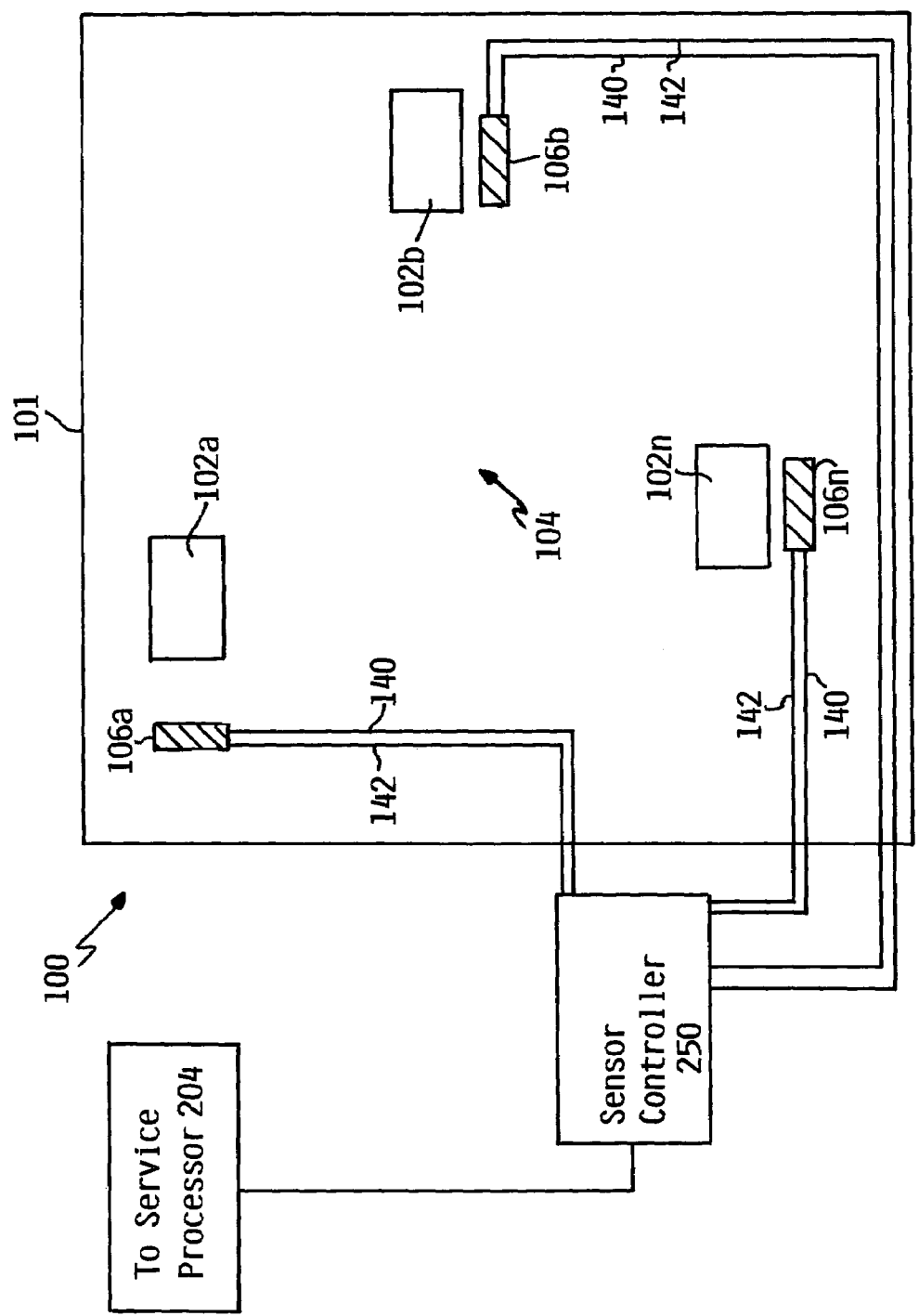
FIG. 1 is a diagrammatic view illustrating temperature sensors on a printed wiring board for monitoring and controlling the temperature of components on the board.

FIG. 1 illustrates one embodiment that is directed to a computer system 100 having a circuit board 101 and its components 102 a-n (collectively, 102). The electronic components 102 are mechanically coupled to the circuit board 101 by conventional means in any suitable manner, and are electrically coupled to among other things, a power source (not shown). For instance, the circuit board may be a printed wiring board ("PWB") of the type used in any known computer system. Although only the circuit board 101 is illustrated, the computer system 100 may operate on a plurality of computer subsystems, such as a motherboard, one or more PCI cards, memory modules (not shown), etc. The electronic components 102 may be of any type and include those that do not function properly if substantially overheated. The electronic components 102 are under the control of the computer system 100 in a conventional manner, as well as a shutdown controller 202 (FIG. 2) of a service processor 204 (FIG. 2) as will be explained; infra.

The heat-induced strain of the circuit or printed wiring board 101 is measured by optical strain gauge sensors 106 a-n (collectively, 106). Each of the optical strain gauge sensors 106 is, preferably, attached or otherwise coupled to the circuit board 101 and provides an optical reference signal monitor assembly. Each one of the optical strain gauge sensors 106 is in a region of the circuit board that is in thermal communication to a respective one(s) of the electronic components 102. Ideally, the locations are at a predefined area (e.g., "hot spots") for which temperature control is preferred. Electrical input to the strain gauge is provided by conventional circuitry 140 from the sensor controller 250. Optical output from the strain gauge sensors 106 is converted into electrical signals at the detector 390 (FIG. 3) then routed via conventional circuitry to the sensor controller 250.

The preferred and alternate embodiments thereof have been enhanced to include an optical sensor array 104. The optical sensor array 104 includes one or more optical strain gauge sensors 106. Each of the optical strain gauge sensors 106 is, preferably, attached or otherwise coupled to the circuit board 101 at discrete locations to be described. While the present embodiment illustrates that the optical strain gauge sensors 106 are attached to the circuit board, other embodiments envision the optical strain gauge sensors on one or more of the components 102.

Figure 2:
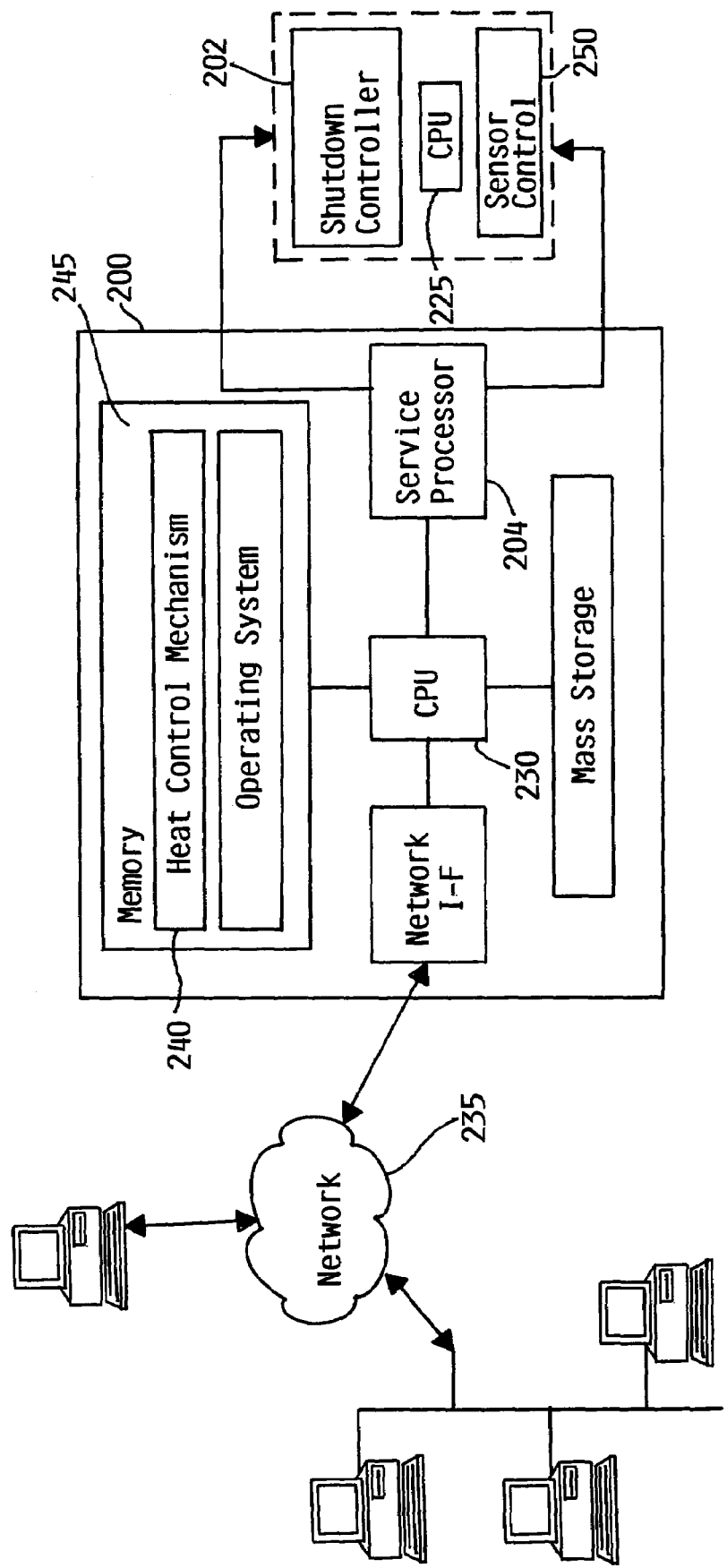
FIG. 2 is a diagrammatic view of a computer system embodying the concepts of the present invention.

In FIG. 2 there is represented a computer system 200, such as an enhanced computer system from International Business Machines Corporation, Armonk, N.Y. Other computer systems similarly configured may be used. Included in the computer system 200 is central processing unit (CPU) 230, service processor 204, and network 235. Included within the service processor 204 are a shutdown controller 202, which executes on a service processor central processing unit 225, and an optical sensor controller 250, which also executes on a service processor central processing unit 225.

It is important to note though, that while shutdown controller 202 is shown to reside and execute on the service processor 204, it could also, in a different configuration, operate on the CPU 230 or on a network controller. It should be further understood that while the embodiments of the present invention are being described herein in the context of a complete system, certain program mechanisms, such as the shutdown controller 202 and sensor controller 250 are capable of being distributed in a computer program product, such as a heat controlling mechanism 240 residing in a memory 245 of the computer system 200. It will be appreciated that a program product can be distributed on different signal bearing media, including, but not limited to recordable-type media, such as digital and analog communication links. In addition, not only can the sensor controller reside and execute on the CPU 225 of the service processor 204, it may also execute on the CPU 230.

Figure 3:
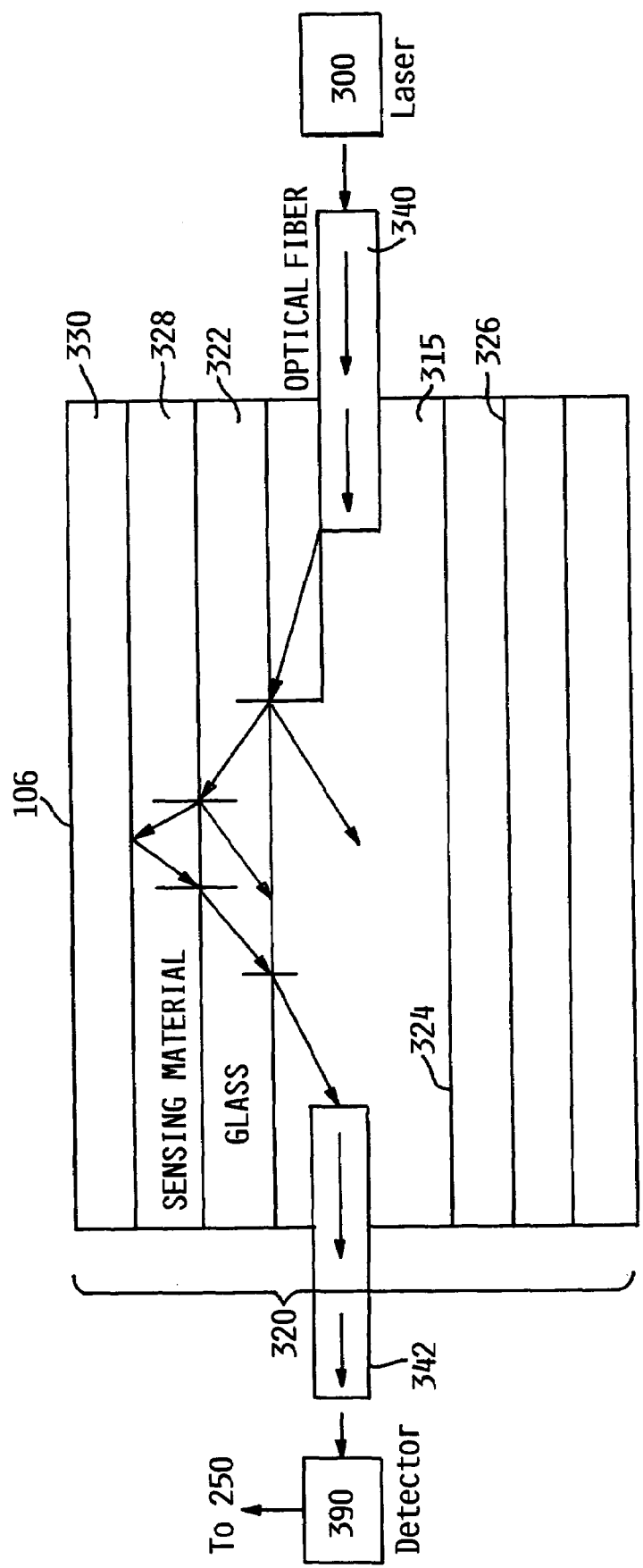
FIG. 3 is a schematic view illustrating one preferred embodiment of an optical strain gauge sensor for use in the present invention.

In FIG. 3, there is an illustrated embodiment of one of the optical strain gauge sensors 106 utilized. The optical strain gauge sensor 106 is in communication with at least a region of the circuit board 101 that is monitored. The optical strain gauge sensors 106 of the preferred embodiment may be of the type capable of measuring submicron strain level(s) of the materials forming the printed circuit board or the components. The optical strain gauge sensor 106 monitors changes in an optical reference signal. As a result, extremely responsive results are obtained. This is an advantage over other approaches because the rate of change is relatively small and yet highly predictive of failure of the board due to heat-induced damage. The resulting signal is indicative of the strain (i.e., elongation) as measured as a function of temperature range of interest. The strain signal has been correlated to a change or delta in temperature of the object being monitored. If it is determined that the rate of strain change (i.e., elongation) reaches a predefined threshold or triggering level, then the service processor 204 becomes operable to reduce or eliminate the flow of electrical power to the component(s) 102 or the like that is responsible for generating the heat in the region(s) being monitored.

FIG. 3 illustrates an optical stain gauge sensor 106 that may be used in the preferred embodiment. The optical strain gauge sensor 106 may be used to determine the strain or elongation of the printed board. The optical strain gauge may be of the kind that is more completely described in patent application, WO/00/43729, PCT/US00/0613. Its description is incorporated herein and made a part hereof. Accordingly, only those aspects thereof that are needed to describe the present embodiment will be set forth. The optical strain gauge sensors 106 of the preferred embodiment each include an optical cavity 315 and a housing 320 that has an interior face 324 and an exterior surface 326. The exterior surface 326 is comprised of at least one layer of low index of refraction material 328, and at least one layer of highly reflective material 330. The materials are made so that the housing 320, glass capillary 322 and layers 328 and 330 have small coefficients of expansion. With this strain gauge, the basic dimensions of the elongation do not change significantly over the temperature ranges encountered in the environment, such as a computer system. The housing is in communication with a first optical fiber 340 and a second optical fiber 342. The strain gauge sensor 106 also comprises a laser light source 300 that emits light energy in a suitable range which is focused on the source optical fiber 340, a photodiode detector 390 which functions as a means for detecting the change in the intensity of light when light is passed through the housing, reflected and refracted within the housing and received by optical fiber 342. The optical wave guide sensor is capable of measuring changes in the submicron range when the housing is stressed. The output from the detector 390 is subsequently routed via conventional circuitry 142 (FIG. 1) to the sensor controller 250. The sensor controller 250 monitors the strain rate of individual optical strain gauges 106 and is in direct communication with the shutdown controller 202.

Table I, below, indicates predictive correlations between the rates of strain (e.g., µε/sec.) or elongation changes relative to the temperature changes for two different operating modes, the latter one of which would be indicative of heat-induced damage for the circuit board 101.

As noted, the circuit board 101 may be of a type, such as made from conventional FR4 material. Other suitable materials may be used. It will be appreciated that the response times and elongations depend on a variety of factors including the kinds of materials being monitored and the characteristics of the sensors being used. Accordingly, the present invention can use the optical gauge sensor in a wide variety of circumstances and the following are exemplary of several.

In Table I, the micro-strain values are based on the coefficient of thermal expansion (CTE) for FR4 circuit boards (i.e., which is approximately 40 ppm/° C. below the $T_g$ (glass transition temperature) of about 165° C. Above this Tg, the CTE of FR4 increases dramatically to approximately 200 ppm/° C.

The first mode that is illustrated in the top row of Table I indicates the change in strain rate for a situation wherein the board goes from a so-called cold start at about 20° C. to a normal operating temperature of about 65° C. It is anticipated that the change in elongation of the board 101 for such a temperature difference is about 1800 µε. A typical time for this elongation to occur is estimated to be about 600 seconds. Accordingly, a nominal value of strain rate of about 3.0 µε/sec. is established.

The second illustrated mode, depicted in the bottom row of Table I, indicates the change in strain rate for a predicted uncontrolled burn event when the system goes from a normal operating temperature of about 65° C. to a temperature of about 200° C. It is anticipated that the change in elongation of the board 101 for such a temperature difference is about 11,000 µε. A typical time for this elongation to occur is estimated to be about 1 second. Accordingly, a threshold or critical value of strain rate of about 11,000 µε/sec. for a temperature range of about 135° C. is established. It will be appreciated that if the strain rate monitored by a sensor between the temperature values noted exceeds a predefined trigger or critical value of, for example ≧30 µε/sec., then such event is predictive of heat-induced damage of the board. Therefore, a shutdown signal of such event may be transmitted by the sensor controller 250 to the shutdown controller 202 under control of the heat control mechanism 245 for modifying (e.g., preventing) power being forwarded to one of the components 102 associated with the region being monitored. The critical value of ≧30 με/sec. may be selected by multiplying the nominal strain rate of the top row of Table I (i.e., 3 με/sec.), by a suitable reliability or safety factor. In this embodiment, the reliability factor is ≧10. Other reliability factor values may be selected. It is desirable that the reliability factor value accommodate situations (e.g., different materials, inaccurate temperatures, times) that might affect the trigger level if the strain rate was just 3 με/sec. for a normal operating condition.

As a practical matter, the present invention contemplates that the triggering or so-called critical strain rate value may be actually set at a suitable value or clip level, for example, between 30-110 με/sec. Such a value may be selected so as to encompass failures during both start-up and uncontrolled burn. Other suitable predefined critical strain rate values may be utilized consistent with the kinds of materials, sensors, and monitoring temperature situations.

TABLE I

| Delta Temperature, (° C.) | Micro-strain (με) | Change in Time, (secs.) | Strain Rate (με/sec.) |
|---|---|---|---|
| 45° C. (ramp from 20° C. ---> operating temp 65° C.) | 1800 | 600 | 3.0 |
| 135° C. (65° C. operating temp ---> uncontrolled burn event 200° C.) | 11,000 | 1 | 11,000 |

Figure 4:
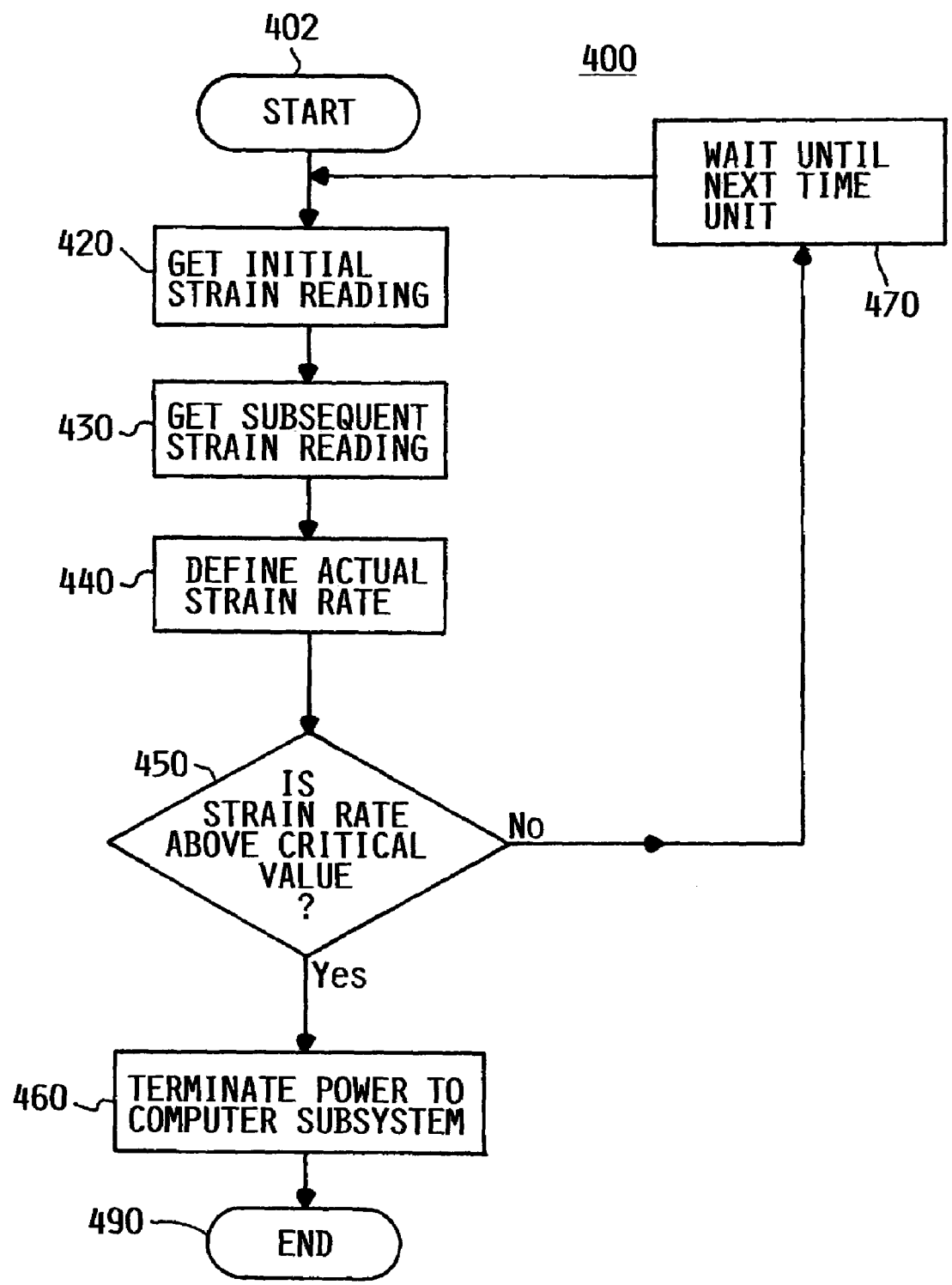
FIG. 4 is a flow chart illustrating one preferred method according to the present invention.

FIG. 4 is a flow chart illustrating one embodiment of a method 400 for monitoring and controlling electrical current delivered to a computer subsystem in response to heat causing elongation of the latter at an unacceptable rate over a temperature range, which rate if exceeded is indicative of potential heat-induced damage (e.g., fire). The method 400 represents one embodiment of the heat-controlling program 240 that is run on the service processor 204. The following description is based on the first mode example in Table I. The readings of the strain gauge sensors 106 are shared using RS 232 interfaces or any other suitable type on the gauge sensors 106 and the service processor 204.

The method 400 then proceeds to block 420 to get the initial strain reading at the region being monitored. As noted, the region may be proximate to one of the components 102. The initial strain reading is intended to be that which is estimated to exist at the start-up (e.g., 20° C.) of the system. Other strain readings that correspond to different temperature readings may also be stored in the memory so that an initial strain reading can be gathered upon start-up. The present invention can also envision monitoring strain at start-up so as to obtain an initial value.

In block 430, the sensor controller 250 gathers a second strain reading from the optical strain gauge 106 and compares it the initial strain value. When the second strain reading is obtained, the method then proceeds to the block 440, whereat the actual strain rate is determined based on the elapsed time from the strain gauge reading at block 420 to a subsequent second strain gauge reading at block 430. The method 400 then proceeds to the decision block 450 to determine whether a potential damaging condition has occurred in the region being monitored. In this regard, the actual strain rate from the block 440 is compared to the critical strain rate value (e.g., 30 με/sec.) for the mode that is being used. It will be noted that the frequency of the sensor readings under control of the sensor controller is such that they may occur at time intervals which allow readings to indicate situations including, for example uncontrolled burn conditions (e.g., less than 1 sec. in the second mode example in Table I). Other monitoring frequency levels may be provided that detect when the object being monitored is subject to potential damaging heat conditions.

If the decision is negative (i.e., No) then the method 400 proceeds to block 470 to wait until a next reading is taken. If the decision is affirmative (i.e., Yes), then the actual strain rate reading approaches or exceeds the predefined clip level or critical strain rate value reading (e.g., 30 με/sec.), then it is likely that the region being monitored is experiencing a heat-induced damaging condition. It will be appreciated that the trigger level at which an affirmative decision is made can vary to take into account a variety of factors including those noted above. The method 400 proceeds to block 460 to terminate power to the component 102 affecting the region. In this regard, the shutdown controller 202 of the service processor operates to terminate power to the electronic component. Following this step, the method 400 terminates in the block 490.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

The invention claimed is:

1. A method comprising: monitoring a change in an optical reference signal of an optical reference signal monitor assembly, whereby changes of the signal are responsive to the differential strain due to temperature variations of an object being monitored; determining if the rate of strain change over a predefined temperature range reaches a threshold level; and, if the determining is true, then providing a representative signal of such event, wherein the strain rate is determined by the elongation of the object being monitored as measured by the optical reference signal changes relative to a time differential of the temperatures of the predefined temperature range being reached by the object being monitored.

2. The method of claim 1, wherein the threshold value is indicative of a potentially damaging event occurring for the object.

3. The method of claim 2, wherein the predefined temperature range includes an initial temperature and a second temperature of the object.

4. The method of claim 1, wherein the representative signal is utilized for modifying heat generated at the object being monitored.

5. The method of claim 4, wherein the modifying includes actions selected from a group consisting of: cooling the object, heating the object, terminating power to the object, reducing power to the object, and, increasing power to the object.

6. The method of claim 1, wherein the optical reference signal is carried out by an optical strain gauge.

7. The method of claim 1, wherein the optical reference signal monitor assembly is incorporated in a printed board.

8. A system of monitoring and controlling heat of an object being monitored, comprising:
- an optical reference signal monitor assembly disposed in proximity to the object being monitored and which is operable for supplying an optical reference signal; the optical reference signal monitor assembly is operable for monitoring changes in the optical reference signal, whereby changes of the signal are responsive to a differential strain due to temperature variations of the object being monitored; and,
- a mechanism for determining if the rate of strain change over a predefined temperature range reaches a threshold level; and, if the determining is true, then providing a representative signal of such event;
- wherein the strain rate is determined by the elongation of the object as measured by the optical reference signal changes relative to a time differential of the temperatures of the predefined temperature range being reached by the object.

9. The system of claim 8, wherein the mechanism sets the threshold level for a potentially damaging event occurring for the object.

10. The system of claim 8, wherein the representative signal is utilized by the mechanism for modifying heat generated at the object being monitored.

11. The system of claim 10, wherein the mechanism effects the modifying to include actions selected from a group consisting of: cooling the object, heating the object, terminating power to the object, reducing power to the object, and, increasing power to the object.

12. The system of claim 8, wherein the predefined temperature range monitored by the mechanism includes an initial temperature and a second temperature of the object.

13. The system of claim 8, wherein the optical reference signal of the optical reference signal monitor assembly is carried out by an optical strain gauge sensor.

14. The system of claim 13, wherein the optical strain gauge sensor is included in a printed board.

15. A signal bearing medium, comprising a program which, when executed by a processor, performs an operation of detecting heat of an object being monitored, the operation comprising:
- monitoring a change in an optical reference signal of an optical unit which signal is directed at the object being monitored and which change is responsive in accordance to the differential strain due to temperature variations on the object being monitored;
- determining if the rate of change of strain exceeds a threshold level; and, if the determining is true, then providing a representative signal of such event;
- wherein the rate of change of strain is measured by the elongation of a unit length of the object in at least one direction relative to a corresponding thermal change of the material of the object being monitored.

16. The signal bearing medium of claim 15, wherein the representative signal is utilized for modifying electrical power to the object being monitored.

17. The signal bearing medium of claim 15, wherein the threshold value is indicative of a potentially damaging event occurring for the object being monitored.

* * * * *